(12) United States Patent
Barber (10) Patent No.: US 11,176,573 B2
(45) Date of Patent: *Nov. 16, 2021

(54) AUTHENTICATING USERS FOR ACCURATE ONLINE AUDIENCE MEASUREMENT

(71) Applicant: Kount Inc., Boise, ID (US)

(72) Inventor: Timothy P. Barber, Boise, ID (US)

(73) Assignee: KOUNT INC., Boise, ID (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/513,041

(22) Filed: Jul. 16, 2019

(65) Prior Publication Data

US 2019/0340642 A1 Nov. 7, 2019

Related U.S. Application Data

(63) Continuation of application No. 15/223,736, filed on Jul. 29, 2016, now Pat. No. 10,402,854, which is a continuation of application No. 13/562,218, filed on Jul. 30, 2012, now Pat. No. 9,430,778.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0248* (2013.01); *G06Q 30/0242* (2013.01); *G06Q 30/0246* (2013.01); *G06Q 30/0609* (2013.01)

(58) Field of Classification Search
CPC ........... G06Q 30/0248; G06Q 30/0242; G06Q 30/0246; G06Q 30/0609
See application file for complete search history.

(56) References Cited

U.S. PATENT DOCUMENTS

| 7,100,195 | B1 | 8/2006 | Underwood |
| 8,185,613 | B2 | 5/2012 | Xie et al. |
| 8,620,933 | B2 | 12/2013 | Holmes et al. |
| 8,655,695 | B1 | 2/2014 | Qu et al. |
| 2004/0049687 | A1 | 3/2004 | Orsini et al. |
| 2004/0243832 | A1 | 12/2004 | Wilf et al. |
| 2005/0102120 | A1 | 5/2005 | Bodin et al. |
| 2008/0010678 | A1* | 1/2008 | Burdette ............ G06Q 30/0603 726/15 |

(Continued)

OTHER PUBLICATIONS

United States Office Action, U.S. Appl. No. 13/562,218, filed Mar. 13, 2014, 17 pages.

(Continued)

*Primary Examiner* — Tarek Chbouki
(74) *Attorney, Agent, or Firm* — Kilpatrick Townsend & Stockton LLP (57) ABSTRACT

Online entities oftentimes desire to ascertain information about their audience members. To determine information about audience members and their activities, online transactions including information about transactions performed by audience members are collected. One or more audience analysis processes are applied to the online transactions to determine the collection of online transactions performed by a given audience member. With an accurate assignment of online transaction to the audience member, the audience member and associated transactions may be classified as a legitimate or illegitimate.

19 Claims, 5 Drawing Sheets

(56) References Cited

U.S. PATENT DOCUMENTS

| | | |
|---|---|---|
| 2008/0276179 A1 | 11/2008 | Borenstein et al. |
| 2009/0103524 A1 | 4/2009 | Mantripragada et al. |
| 2010/0106611 A1 | 4/2010 | Paulsen et al. |
| 2010/0145773 A1 | 6/2010 | Desai et al. |
| 2010/0146622 A1 | 6/2010 | Nordstrom et al. |
| 2010/0153275 A1 | 6/2010 | Jakobsson et al. |
| 2010/0312877 A1 | 12/2010 | Xie et al. |
| 2011/0087495 A1 | 4/2011 | O'Neill et al. |
| 2011/0191179 A1 | 8/2011 | Linietsky et al. |
| 2011/0191832 A1 | 8/2011 | Davis et al. |
| 2011/0191847 A1 | 8/2011 | Davis et al. |
| 2011/0302061 A1 | 12/2011 | Olives et al. |
| 2012/0041939 A1 | 2/2012 | Amsterdamski |
| 2012/0136981 A1 | 5/2012 | Bodin et al. |
| 2012/0310702 A1 | 12/2012 | Paulsen et al. |
| 2012/0311684 A1 | 12/2012 | Paulsen et al. |
| 2013/0024274 A1 | 1/2013 | Villars |
| 2013/0097664 A1 | 4/2013 | Herz et al. |
| 2013/0110715 A1 | 5/2013 | Buchhop |
| 2013/0124315 A1* | 5/2013 | Doughty ............ G06Q 30/0261 705/14.53 |
| 2013/0231084 A1 | 9/2013 | Raleigh |
| 2013/0304581 A1 | 11/2013 | Soroca et al. |

OTHER PUBLICATIONS

United States Office Action, U.S. Appl. No. 13/562,218, filed Oct. 15, 2015, 21 pages.
United States Office Action, U.S. Appl. No. 13/562,218, filed Oct. 24, 2014, 20 pages.
United States Office Action, U.S. Appl. No. 15/223,736, filed May 15, 2018, 17 pages.
United States Office Action, U.S. Appl. No. 15/223,736, Nov. 2, 2018, 16 pages.
United States Office Action, U.S. Appl. No. 15/223,736, filed Sep. 20, 2017, 17 pages.

* cited by examiner

AUTHENTICATING USERS FOR ACCURATE ONLINE AUDIENCE MEASUREMENT

CROSS REFERENCE TO RELATED APPLICATIONS

The present application is a continuation of U.S. application Ser. No. 15/223,736, filed Jul. 29, 2016 which is a continuation of U.S. application Ser. No. 13/562,218, filed Jul. 30, 2012, now U.S. Pat. No. 9,430,778 issued Aug. 30, 2016, each of which is incorporated by reference in its entirety.

BACKGROUND

The present invention generally relates to the field of measuring online viewership and more specifically to authenticating users.

Online audience measurements have a variety of applications in the field of Internet advertising and information consumption, including the determination of the audience of specific online media such as a website, video, article, blog, advertisement, file offered for download, etc. For example, advertising entities desire to know the number of unique visitors associated with a specific ad associated with a specific item of online media. Non-advertising entities desire to know the number of unique visitors associated with the media they provide. Advertising entities can leverage an accurate audience measurement to "get what they pay for" and non-advertising entities can leverage the same accurate audience measurement to market their popularity to the advertising entities.

In television and print media outlets, established statistical methods exist for measuring audience size. Online entities measure audience size by estimating the number of unique machines visiting a given web site on a given day. While this method suffices for generic traffic measurements over short intervals, conducting an accurate census of the number of actual humans (legitimate users) that constitute unique visitors frequenting any given online media over time is a much harder task. Some impediments to conducting an accurate census are, for example, individual users with multiple accounts for the same website and users with a variety of personal devices that access the same website from various locations. Other impediments include nefarious users that may create automated programs to generate large number of fake user accounts, fake interactions or hijack other users' systems and direct them to a webpage to inflate the number of unique visitors. Nefarious users may use many methods to commit fraud or otherwise negatively impact the experiences and participation of legitimate users.

SUMMARY

An audience analysis server is configured to store a plurality of online transactions received from various online entities. Each online transaction represents an activity performed by an online audience member and includes transaction information such as a description of the activity and attributes associated with the activity. For example, an online transaction may indicate that a television was purchased on a given date with a given credit card and a given device was used to perform the purchase.

Each of the plurality of online transactions is assigned to a set of transactions in a plurality of sets based on one or more characteristics in the transaction information. One or more audience analysis processes are iterated over the sets to modify and refine the assignment of transactions to sets and determine associations between sets.

An audience analysis process may further analyze associations between sets to attribute a collection of set to an audience member. The collection of sets attributed to an audience member substantially contains all transactions for activities performed by the audience member.

An audience analysis process may further analyze the collections of sets attributed to two or more audience members to determine correlations between audience members. The correlations can indicate relationships between audience members or whether the collections of sets represents only one audience member.

With a number of transactions and/or sets attributed to an audience member, the transactions and sets are analyzed to determine whether they represent legitimate or illegitimate behavior. The audience member and associated transactions are classified accordingly for audience measurements and monitoring services.

Analysis of legitimate user behavior may be reported for establishing the number of user's interacting with a given online entity or performing a given activity. The audience analysis process may further analyze illegitimate behavior to yield a representation of illegitimate audience members and their activities for mitigating fraudulent activities of users online. A variety of other analysis may be performed and based on any of the attributes present in transaction information.

The figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures.

DETAILED DESCRIPTION

Overview of Audience Measurements

Various aspects of the disclosure facilitate accurate online audience measurements determined from online activities performed by audience members. The total sum of audience members includes legitimate users and various illegitimate entities such as nefarious users using hijacked accounts or legitimate user's identities, hijacked computer systems and automated computer programs, known as bots. As the legitimacy of an audience member cannot be determined a priori or, more generally, from one activity alone, activities performed by all audience members are recorded prior to conducting an online audience measurement. The records are subsequently analyzed using a combination of audience analysis techniques described herein to ultimately attribute each record to either a specific legitimate or illegitimate audience member. The multitude of legitimate audience members identified through the audience analysis processes constitutes the true online audience.

Furthermore, with a number of records attributed to existing audience members, additional incoming records are examined and readily attributed to the appropriate audience member (or new member) in view of the previously performed analysis. By processing a multitude of records over time and re-performing audience analysis routines as necessary, the actions and online identities associated with illegitimate audience members can be identified and reported along with the number of legitimate audience members.

The present disclosure contemplates a discrete set of transaction information obtained for any given online activity as a transaction record. The transaction information collectively includes data such as information or characteristics describing the physical device performing the transaction, location or address (e.g., physical or electronic), active online accounts during or proximate to the transaction and the activity itself. Within the collective of transaction information, there exists a variety of data that can be broken down into unique identifiers and contextual information. Generally, unique identifiers (unique IDs) are irreducible characteristics associated with the transaction and often correspond to a single audience member while the contextual information provides supplementary details about the activity performed.

Some examples of unique identifiers associated with the physical device within the transaction information include a user account with the device (device UID), media access control (MAC) address, Internet protocol (IP) address and a cookie value. Some examples of unique IDs associated with online accounts or the activity performed include registered user account names and passwords, email address, credit card or bank account numbers, shipping or billing addresses, online payment accounts, or hashes thereof.

Some examples of contextual information include domain name, timestamps, Uniform Resource Locator (URL) and keywords associated with activity, hardware configuration or settings of the device such as time zone or language, application or operating system identifier, device type, Internet protocol (IP) address, available networks (wired and wireless), application preferences, nicknames, dates of birth and device location. Contextual information may also include device capabilities such as connection speed or connection strength, GPS, radiation, audio or video capture and other sensors. While contextual information is generally not irreducible, a script or module may collect a vast amount of contextual information for a given transaction or device that may be combined to form a fingerprint that can serve as a unique ID. For example, a combination of hardware and software or other contextual information may be treated as a unique ID absent other information (e.g., if a user is using an identified proxy server or spoofing unique IDs such as MAC addresses).

In some embodiments, an IP address may be used as both contextual information and/or a unique ID. For example, an IP address associated with transactions performed using a home network is more unique than an IP address associated with a business or public wireless network. Additionally, different IP visions may carry additional information that may be used as a unique identifier or for determining a unique identifier. For example, IPv6 addresses may include information for identifying a particular device on a private (e.g., home, business, wireless) network that connects to the Internet via a router or other network switching device. Accordingly, and IP address may be parsed into unique ID components associated with the device, which may remain the same across different networks, and/or contextual components that may be used to determine an ISP (internet service provider), location, etc. (e.g., via a "whois" look-up).

Conceptual Representation of the Online Audience

Figure 1:
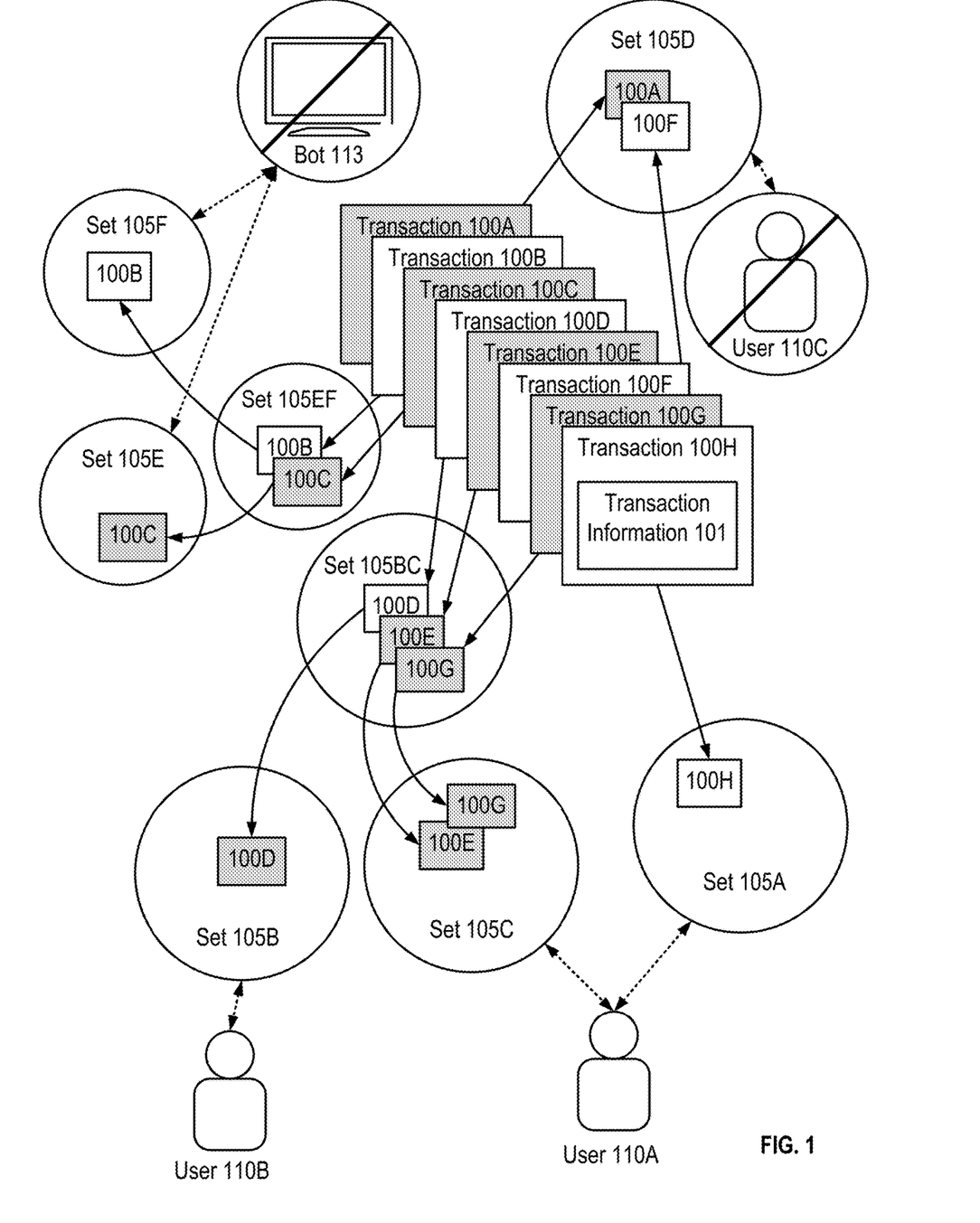
FIG. 1 is a block diagram illustrating an application of audience measurements based on a series of online transaction records according to one embodiment.

FIG. 1 is a diagram illustrating an application of audience measurements based on a series of online transaction records 100 according to one embodiment. The transactions 100 represent various audience members' online activities and each include varying amounts of corresponding transaction information 101.

Also illustrated are members of an online audience subsequent to an audience measurement performed over a variety of transactions 100. As shown, the online audience includes legitimate users 110A,B, and illegitimate users such as user 110C and bot 113.

Typically, the transactions 100 are obtained from a variety of online entities such as content providers, Internet-enabled payment systems, websites such as social networking sites and forums, and advertisers (not shown) that participate in an online audience measurement service. Accordingly, the transactions 100 cover a breadth of activities audience member engage in with the online entities such as online purchases, downloads or views of media, logins or logoffs to online accounts (herein "login events"), etc. In FIG. 1, for example, transaction 100E may correspond to user 110A making an online purchase, transaction 100G to user 110A streaming a video and transaction 100D to user 110B logging into an email account. Other examples are discussed in more detail below.

Also illustrated are snapshots of sets 105 of transactions 100 during the audience analysis process. Initially, each transaction 100 is attributed to a set 105 according to one or more filtering parameters. New sets are assigned an audience ID (not shown). In one embodiment, the filtering parameters are based on one or more unique IDs associated with most transactions 100. For example, the transactions 100 in FIG. 1 are initially attributed to sets 105A, 105BC, 105D and 100E based on the MAC address associated with the audience members' devices used to perform the respective transactions.

However, as shown, the initial filtering may not yield an accurate audience measurement. For example, set 105BC includes transactions 100 corresponding to a device used by multiple legitimate users 110A and 110B and hence, results in a deflated audience measurement. Other issues arises when a single user accesses content with multiple devices. For example, sets 105A and 105BC each include transactions 100 corresponding to activities performed by user 110A on two different devices and hence, results in an inflated audience measurement.

Additional shortcomings of the initial filtering process include difficulty in recognizing illegitimate entities such as bots 113 and nefarious users 110C and their nefarious transactions 100. For example, over a given time period, bots 113 imitating human interactions are often indistinguishable from legitimate users. Furthermore, nefarious users 110C and their activities performed using hijacked accounts or identities of legitimate users are oftentimes undetectable unless specific flags are raised such as an invalid velocity measurement between two transactions. The inability to distinguish nefarious activities from legitimate ones results in, at best, an inflated audience measurement. At worst, legitimate users' experiences with the content providers are compromised.

Once the transactions 100 are attributed to sets 105A, 105BC, 105D and 105EF based on the initial filtering parameters, further audience analysis processing is implemented to identify the legitimate users (e.g., users 110A and 110B) and their respective transactions for the audience measurement. In addition, some embodiments of the further audience analysis processing identify illegitimate entities 113, 110C that may be reported to participants in the audience measurement.

In one embodiment, an audience analysis process analyzes the transactions 100 within a set 105 (e.g., initial sets 105A, 105BC, 105D and 100E) and determines whether the transactions coalesce. Transactions 100 within the set 105 coalesce if they contain reciprocal transaction information 101 attributable to a single audience member. If one or more transactions 100 within the set 105 do not coalesce, additional sets and audience IDs are created for the non-coalescing transactions. The audience analysis process may then analyze the transactions 100 assigned to the additional sets and determine whether those transactions coalesce until each set is attributable to a single audience member. Referring to FIG. 1, the respective transactions 100 within set 105EF and set 105BC do not coalesce and are assigned to new sets 105E,F and 105B,C as shown.

Some indicators of coalescing transactions 100 include reciprocal transaction information 101 such as user names, email addresses, password hashes and other unique identifiers, such as fingerprints derived from contextual information, that may not have been considered during the initial filtering process. Additional indicators of coalescing transactions 100 include contextual information such as timestamps or browsing activities (e.g., similar keywords or related web pages) indicating that the transactions correspond to a single browsing session or similar browsing habits.

As mentioned above, the initial filtering process may have attributed transactions 100 to set 105BC based on a unique identifier associated with a specific device. However, as shown in FIG. 1, transaction 100E and 100D ultimately correspond to user 110A and user 110B, respectively, and may be misattributed due to the users logging into their respective social networking accounts from the same computer. Additionally, user 110A may have accessed an online email account (e.g., transaction 100G) with the same password as the social networking site. Analysis of the transaction information 101 within set 105BC may indicate that transactions 100G and 100E have a reciprocal password hash while transaction 100D does not. Absent additional information, transactions 100G and 100E would coalesce as shown in set 105C and correspond to user 110A while transaction 100D would coalesce in set 105B and correspond to user 110B. As set 105BC spawned multiple sets 105B, 105C representing unique users, the audience IDs attributed to those spawned sets may also be associated with set 105BC to indicate that the transactions within or assigned to set 105BC may correspond to one of several audience members.

In some instances, however, the reassignment of transactions 100 inflates the number of audience members with the creation of new sets and audience IDs. For example, the transaction coalescing operation may reassign transactions 100B and 100C from set 105EF to sets 105E and set 105F, even though (with hindsight) the transactions within set 105EF correspond to a single audience member, bot 113. This issue may arise due to both legitimate and illegitimate audience member activities. As illustrated, for example, an illegitimate user such as bot 113 may login to or create a number of bogus user accounts (e.g., transactions 100B and 100C) with randomized user names and passwords. Similar circumstances occur on public computers where multitudes of users access their accounts and other online information. In another example, a legitimate user may access a business and personal email account with distinct user names and passwords for each.

In one embodiment, an audience analysis process analyses the transactions 100 across multiple sets 105 to determine whether two or more sets correlate and thus, are attributable to a single audience member. Sets 105 correlate if one or more of their respective transactions 100 contain reciprocal transaction information 101 that may not have been considered during the initial filtering process. If two or more sets 105 correlate, they are assigned the same audience ID. Referring to FIG. 1 for example, user 110A may accesses content with two devices, which correspond to set 105C and set 105A. If user 110A uses similar unique IDs across a number of accounts or devices, set 105C and set 105A will contain reciprocal transaction information 101 and therefore are assigned the same audience ID.

In one embodiment, an audience analysis process analyzes sets 105 attributed to the same audience ID and determines whether the sets coalesce. Sets 105 attributed to the same audience ID coalesce if they normalize within constraints indicative of legitimate user behavior. Constraints can be global and apply to the majority of audience IDs associated with legitimate users (e.g., they define typical behavior of legitimate user behavior). Constraints can also be local and apply to a specific audience ID (e.g., they define behavior typical of the audience ID). If the sets 105 attributed to the same audience ID coalesce according to both local and global constraints, the audience ID very likely corresponds to a single legitimate audience member. If one or more sets 105 do not coalesce, they may be assigned to a new audience ID or warrant further analysis of the audience ID.

In one embodiment, an audience analysis process analyzes sets 105 attributed across multiple audience IDs to determine whether two or more audience IDs are correlated, and thus are attributable to a single audience member. For example, some users 110 may use different passwords and user names between each of their online accounts in addition to using several devices. Such usage characteristics may cause difficulties in attributing the various sets 105 to the same audience ID. However, the audience member may frequently use the devices in the same location or configure the devices with similar settings. By comparing a collection of sets associated with one audience ID with a collection of sets associated with another audience ID, the correlation of contextual information in addition to unique IDs may indicate that the sets are consistent with the activities of a single audience member (e.g., two devices and accounts are operated in the same location at the same time).

Further, the audience analysis process for analyzing sets 105 attributed across multiple audience IDs may determine relationships between two or more audience IDs. For example, two audience members (e.g., a married couple) may use separate devices, online accounts and passwords, but share financial information. Identifying such relationships indicates combinations of transaction information common to one or more legitimate audience members and allows the system to determine which transactions (and thus audience IDs) are fraudulent based on deviations in transaction information. In another example, the audience analysis process determines relationships between two or more audience IDs based on access of the same or nearby networks (e.g., based on an analysis of networks available to a device) to determine locations of users and nearby services or audience members.

Other examples and audience analysis processes are discussed in more detail below with reference to FIGS. 3-5.

System Environment

As used herein, the term "module" refers to computer program instructions and other logic used to provide the specified functionality. Thus, a module can be implemented in hardware, firmware, and/or software. In one embodiment, program modules formed of executable computer program instructions are stored on a non-transitory storage device, loaded into memory, and executed by a processor as one or more processes.

Figure 2:
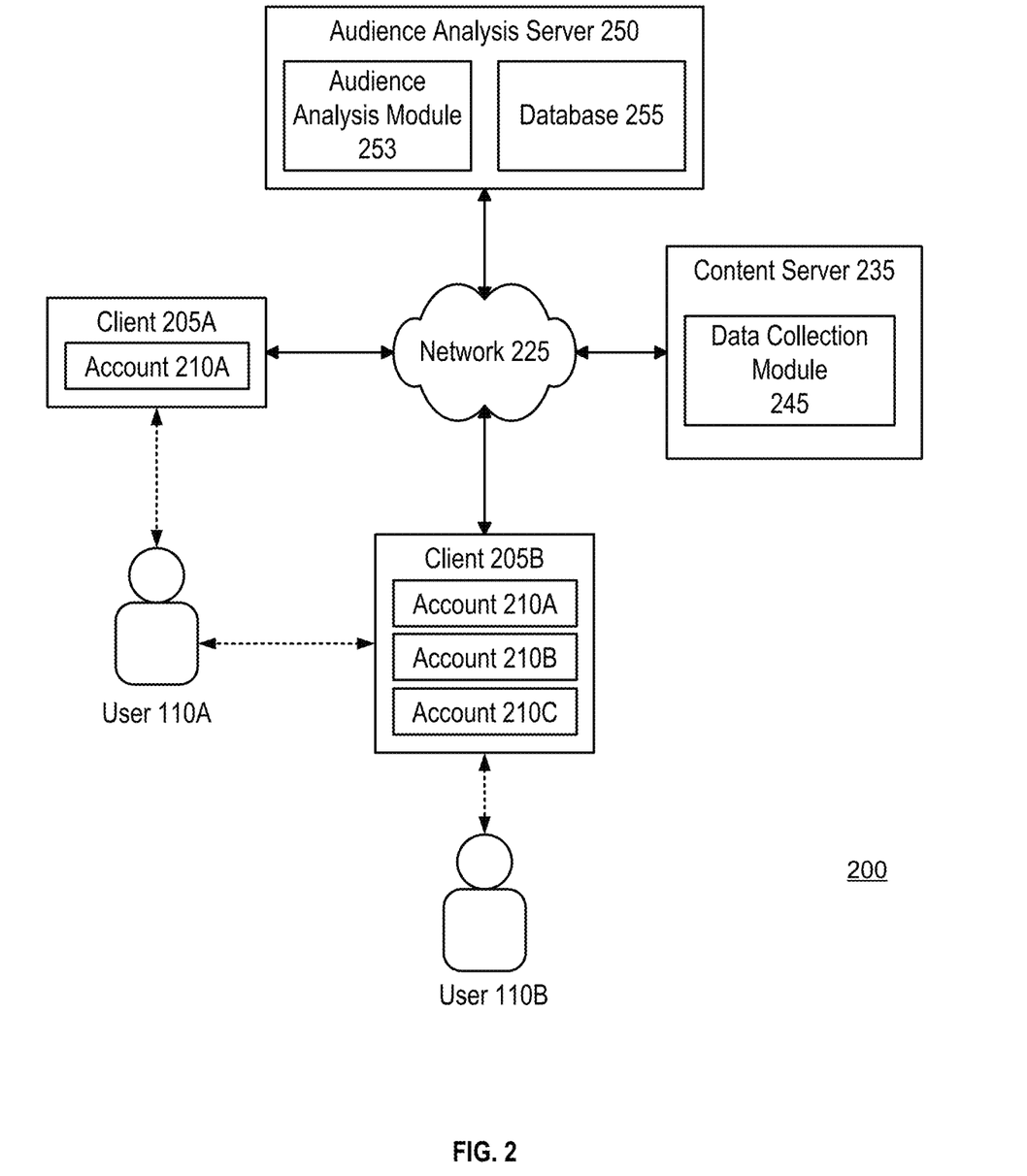
FIG. 2 is a block diagram illustrating an example environment for conducting online audience measurements according to one embodiment.

Referring to FIG. 2, the computing environment for performing audience analysis at an audience analysis server 250 includes network 225, content server 235 and audience members' clients 205. While only one content server 235 and two clients 205 are illustrated in FIG. 2 for clarity, other embodiments contemplate many content servers and vast numbers clients that access content from one or more of the content servers. Additionally, functionality of the audience analysis server 250 may be incorporated directly into a content server 235 or vice versa.

The client 205 may be any type of computing system with a processor and memory capable of running applications, such as a web browser, content browser or native application, for retrieving and sending data over a network 225. For example, audience members may use a client's 205B browser to access content hosted on the content server 235. As discussed herein, clients 205 include the body of devices capable of interacting with various content servers 235 participating in the audience analysis service. Examples of clients 205 include desktop, notebook, or tablet computers and other devices such as mobile telephones, in vehicle systems and gaming consoles or network enabled set top boxes and televisions.

Content server 235 provides consumable media content and online services over the network 225 to the clients 205. For example, the content server 235 can provide search results, text, images or video content, fulfill an online purchase or authenticate a user ID or device responsive to information received from a client 205.

As shown in FIG. 2, the content server 235 includes a data collection module 245 for determining transaction information 101 and storing transaction records 100 corresponding to client 205—server 235 interactions. As described above, the transaction information (reference numeral omitted for clarity) can include unique identifiers and contextual information associated with the interaction such as client 205 device hardware or software, active or authenticated online accounts with the content server 235 and the data exchanged or description thereof. The content server 235 transmits transaction records (reference numeral omitted for clarity) containing the transaction information to the audience analysis server 250 for processing.

In some embodiments, the data collection module 245 hashes or encrypts portions of the transaction information to protect sensitive user data prior to transmission to the audience analysis server 250. If the transaction information is encrypted, the key and function are provided to the audience analysis server 250.

If certain transaction information (e.g., a password or user name) is hashed, the data collection module 245 may indicate one or more other content servers 235 using the same hash function. Thus, the hash values from a collection of content servers 235 may be compared without compromising sensitive data.

In some embodiments, the data collection module 245 may include a description of the transaction information that corresponds with hash values to aid in analysis. For example, the description of variable, user defined data such as passwords or user names may indicate the number of characters hashed (e.g., four, six or eight) and an extraction paradigm (e.g., first four, last six, middle eight or all). Further, the data collection module 245 may produce a variety of hash values from a single password or user name based on the application of multiple extraction paradigms to facilitate comparisons with hash values from other content server 235 that have varying password and user name requirements.

In practice, for example, one content server 235 may require a password length of eight characters and another may require six. Even if the passwords are hashed using the same function, many comparisons are invalid because user's choose to comply only with the minimum requirements. Recognizing that users often prefix or suffix a common set of characters with additional characters to comply with password length or other requirements, the data collection module 245 hashes various portions of the passwords to enable comparisons of different length password strings. In the above example, the data collection module 245 may extract and hash one or more six character strings (e.g., first six characters, last six characters or middle six characters) from the eight character password to allow comparisons with six character passwords.

The audience analysis server 250 is a computing system with a processor and memory that includes an audience analysis module "analysis module" 253 and a transaction database 255. The transaction database 255 receives and stores transaction records from content servers 235. The transaction database 255 may additionally store information the analysis module 253 determines about the transactions.

The analysis module 253 processes transaction records according to one or more audience analysis routines to attribute the transactions among unique audience IDs representing the audience members who performed the activities. The analysis module 253 assigns each transaction to a set based on its transaction information and processes the set until resulting sets include only those transactions belonging to a single audience member. The resulting sets of transactions are assigned unique audience IDs and processed further until sets that belong to same audience member are assigned the same audience ID. The audience analysis module 253 stores information including the set assignments for the transactions and the unique audience IDs attributed to sets and transactions in the database 250. As a result of the processing, the analysis module 253 determines various audience measurements such as the legitimacy of each audience member based on their activities and the total number of legitimate audience members. The audience analysis server 250 reports determined audience measurements to the content server 235.

In some embodiments, the audience analysis server 250 provides data collection modules 245 to content servers 235 participating in the audience measurement. Alternatively, the audience analysis server 250 may provide the collection module 245 for incorporation (e.g., a plug-in or toolkit) into another existing or third party data collection module to enable the functionality detailed herein.

The network 225 represents the communication pathway between clients 205 and servers 235, 250. In some embodiments, the network 225 uses standard communications technologies or protocols and is the Internet. In other embodiments, the network 225 can also use custom or dedicated data communications technologies instead of, or in addition to, the Internet. The network 225 can also use dedicated or private communications links that are not necessarily part of the Internet.

In one embodiment, a party with a vested interest in the content server 235 desires to ascertain the number of clients 205 and/or audience members (e.g., users 110) accessing the content server 235. Further, the party may desire to ascertain which content or services the content server 235 provides to the respective clients 205 and users 110. The party may also desire to ascertain information about illegitimate entities abusing their services. In order to provide the necessary information to the audience analysis server 250 to ascertain these details, data collection module 245 is configured on the content server 235.

As the clients 205 interact with the content server 235 to perform various activities, the data collection module 245 determines, for a given activity, transaction information from the client and the content server. The collection module 245 stores transaction records corresponding to the clients' activities, which include the determined transaction information. The collection module 245 transmits stored transaction records the to audience analysis server 250 for determining audience measurements.

The audience analysis server 250 stores received transaction records and, in turn, determines audience measurements for content servers 235. To determine the audience measurements, the audience analysis server 250 initially assigns each transaction record to a given set based on the associated transaction information. The audience analysis server 250 assigns sets audience IDs. A given audience ID is ideally assigned to a collection of sets that include all the transactions corresponding to the activities of a single audience member.

To improve the accuracy of audience measurements, the audience analysis server 250 performs an audience analysis process that refines the attribution of transaction records among sets and the attribution of the sets among audience IDs. Further, the audience analysis process examines the sets assigned to audience IDs and determines relationships between audience IDs to determine the legitimacy of audience members and detect fraudulent activities. The audience analysis server 250 stores the determined information for dissemination to the content server 235 administrators and other sources.

The audience analysis server 250 may receive additional transaction records after one or more sets 105 are already created and examine their transaction information to either assign a transaction to an existing set having similar information or create a new set. In turn, the audience analysis server 250 may again perform one or more audience analysis processes to further improve the audience measurements based on the additional transactions.

The audience measurements determined by the audience analysis server 250 can include, but are not limited to:
    activities of individual members of the online audience, such as impressions or conversions of advertising or clicks or other online user behaviors,
    categorization of individual members of the online audience,
    trends related to activities for a given site,
    trends related to activities for a selection of sites,
    trends related to activities for the universe of sites, and
    trends related to the methods or devices used to conduct activities.

Audience Analysis Module

Figure 3:
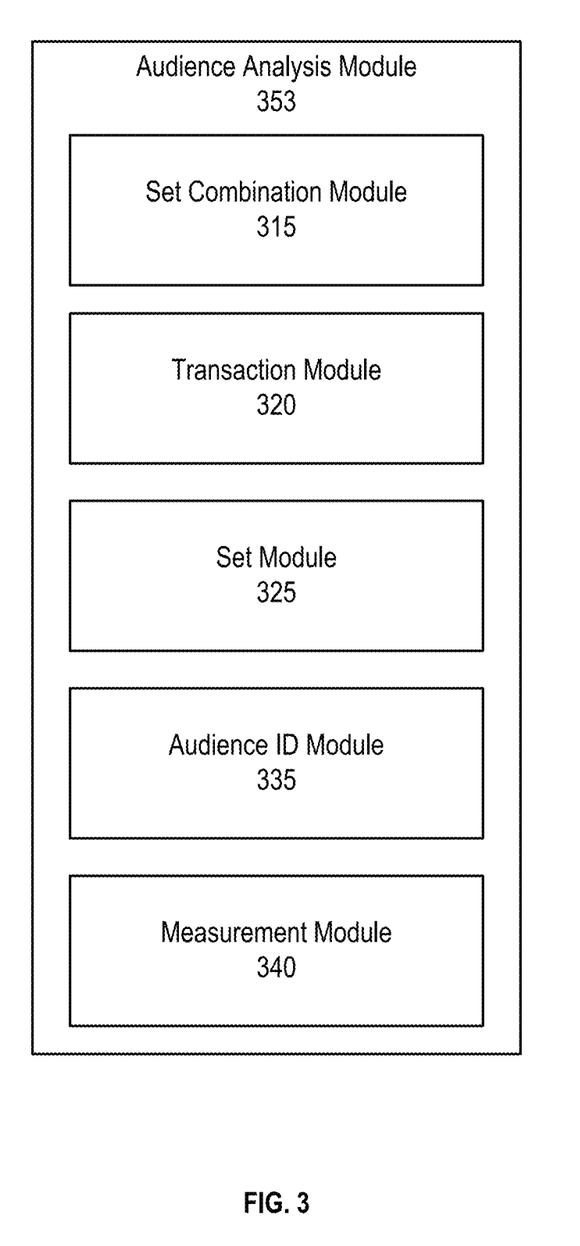
FIG. 3 is a block diagram illustrating a detailed view of an audience analysis module for conducting online audience measurements, according to one embodiment.

FIG. 3 is a high-level block diagram illustrating a detailed view of the audience analysis module ("analysis module") 253 of the audience analysis server 250 according to one embodiment. As shown in FIG. 3, the analysis module 253 contains multiple modules including a set combination module 315, a transaction module 320, a set module 325, an audience ID module 335 and a measurement module 340. In some embodiments, the modules' functions are distributed in a different manner than described herein. In addition, other embodiments have additional and/or other modules.

The set combination module 315 examines the transaction information of a collection of transaction records and determines initial filtering parameters used for assigning transaction records into initial sets (reference numeral omitted for clarity). The set combination module 315 may also receive initial filtering parameters from another entity such as the measurement module 340. In one embodiment, the combination of initial filtering parameters includes irreducible unique IDs found in the transaction information of most transactions. Some examples include, MAC addresses, payment information, account information (e.g., user name and password), location and IP addresses, which are typically coherent over the course of several browsing sessions, or longer. In other words, a combination of one or more unique IDs is selected such that each transaction is assigned to sets indicative of a single device, account, location, credit card, etc. or combination thereof. Given the selected combination of unique IDs, the transaction module 320 assigns the transactions to sets for one or more analysis processes.

In some embodiments, the set combination module 315 may determine more than one selection of initial filtering parameters. By subjecting transaction records to separate selections of filtering parameters and performing a separate audience analysis on each selection, inconsistencies between the final number of audience members and the sets/transactions attributed to the audience members can be examined by the measurement module 340.

More specifically, each combination of initial filtering parameters can be used to inherently determine a different measurement about audience members after the analysis process. For example, choosing a MAC address as the single initial filter creates at least one set for every device (assuming there is no overlap). Thus, after processing, tabulating the number of initial sets associated with a given audience member indicates the number of devices used by the audience member. Basing initial sets on an account name and service combination (e.g., by domain) indicates the number of accounts with various services used by an audience member. Basing initial sets on a credit card number indicates the number of credit card accounts (if any) used for online purchases by an audience member. And so on. Combinations of these elements similarly result in initial sets indicating the number of device-credit card combinations associated with an audience member.

In another embodiment, the combination of initial filtering parameters includes specific online content and services (e.g., by URL or domain). Thus, transactions corresponding to different URLs or services (and any other selected parameters) are assigned to respective initial sets. After the audience analysis process spawns numerous sets from the initial sets of popular URLs, for example, the legitimate audience IDs associated with an initial set are tabulated and reported as the online audience. Tabulating the number of initial sets corresponding to an audience ID would indicate the number of URLs visited (and which were visited) by the audience member.

Ideally, the final assignment of an audience ID to each transaction remains the same regardless of the initial filtering. However, the initial filtering of transactions into sets allows the measurement module 340 to efficiently deduce key information about audience members. Additionally, embodiments of the measurement module 340 analyze discrepancies between the final assignments not only to refine the measurement process but also to determine fraudulent behavior.

Transaction Analysis

The transaction module 320 analyzes transactions and builds sets in the database 255 based on their transaction information. For each transaction, the transaction module 320 determines the unique IDs present in the transaction information and determines whether the transaction includes at least the combination of unique IDs specified by the initial filtering parameters. If the initial filtering parameters are present, the transaction module 320 examines the database 255 and assigns the transaction to an existing initial set (e.g., if a transaction with those parameters was previously processed) or creates a new initial set based on the parameters. If the transaction information does not include the combination of unique IDs used in the initial filtering process, the transaction module 320 may either reject the transaction for being nondescript or search for/create a set defined by the unique IDs that are present.

In some embodiments, the transaction module 320 processes additional transactions after one or more audience analysis processes were performed on existing sets. In such cases, the transaction module 320 may identify an existing initial set for the transaction and subsequently perform a best match search among sets that spawned from the initial set during the audience analysis to refine the initial placement of the transaction. The best match search can take into account additional unique IDs or contextual information associated with the transaction beyond the combination of initial filtering parameters. In this way, as the audience analysis processes refine the existing sets and transactions attributed to audience IDs, the transaction module 320 efficiently places incoming transactions with the appropriate set and thus audience member. For example, an initial set based on the MAC address of a client may include transactions for login events of three different user accounts corresponding to three different audience members. In turn, the audience analysis spawns three sets having unique audience IDs from the initial set. If an incoming transaction for a login event has the same MAC address and matches one of the user accounts, the transaction module 320 can automatically assign the transaction to the correct audience ID.

Set Analysis

The set module 325 analyzes individual sets and determines whether the transactions within a set are attributable to more than one audience member. Typically, the transaction records assigned to the same set include transaction information beyond the initial filtering parameters. The amount of additional transaction information can depend on the activity performed, the device used and which content server 245 collected the data. The set module 325 analyzes the additional transaction information across the transactions within a set to identify collections of coalescing transactions with reciprocal transaction information. The identified collections of transactions are each indicative of a single audience member's activities. If the set module 325 identifies two or more collections of transactions within the set, new sets and audience IDs are created based on the collections and stored in the database 255.

In some embodiments, the set module 325 associates the audience IDs of newly created sets with their parent set (e.g., an initial set). Thus, for example, the parent set may receive incoming transactions and hold transactions that the set module 325 has not yet attributed to an audience member associated with the set based on reciprocal transaction information. Some examples of using reciprocal transaction information for identifying collections of transactions from a single audience member are discussed below.

Reciprocal unique IDs such as user names and/or passwords across multiple transactions often indicate that the transactions belong to the same audience member. However, login information in transactions can result from both active login events (e.g., logging in or out of an account or confirming an account password) and passive login data (e.g., data detailing an active account during the activity). Reciprocal transaction information between active login events strongly suggests one audience member over another is responsible for the transactions while passive login data is less indicative.

Difficulties discerning one audience member from another using passive login data typically results from accounts that are left logged into and then included in the transaction information. For example, a social networking service may partner with various content providers to provide external functionality to the logged into account. Additionally, an online account used across a variety of linked web services (e.g., email, search and news) may stay logged into unbeknownst to the current user. As audience members access the partner content or navigate the partner web pages or linked services when another user's account is active, device settings and the data collected may result in misleading transaction information for transactions collected during the browsing session.

To accurately separate the transactions in sets with login information for multiple audience members, the set module 325 first determines which transactions correspond to active logins. From the transactions for active logins, the set module 325 determines which of those transactions correspond to the same audience member based on reciprocal password and user name information. The set module 325 further determines which transactions were collected proximate (e.g., during the same browsing session) to the transactions for the identified active login events and attributes them to that audience member.

If a browsing session includes transactions with only passive login data, the set module 325 determines a probability of whether the transactions correspond to the previously identified audience member or next identified audience member based on their contextual information such as devise settings, location used, websites browsed or information searched. If the set module 325 identifies similar contextual information from another browsing session with an active login event, the transactions are attributed to the same audience member.

Additionally, the set module 325 may attribute transactions to an audience member that frequently uses the client 205 (e.g., if most transactions correspond to that audience member) or if the transaction information identifies the client as a personal device such as a PDA or mobile phone typically used by a single audience member.

Whereas the set module 325 previously examined individual sets to determine whether the transactions therein belonged to more than one audience member, other embodiments of the set module 325 analyze transactions across multiple sets to determine whether two of more of the sets are attributable to a single audience member. Recognizing that the collection of transactions in an existing set is based on a given combination of transaction information (e.g., unique IDs from the initial filtering parameters), the set module 325 identifies additional combinations of unique IDs from transactions within the set that are indicative of the audience member's online activities.

The set module 325 compares the combinations of unique IDs to the transaction information of other existing sets to determine collections of correlated sets for each unique ID combination. The collections of correlated sets having reciprocal transaction information are attributed to the same audience member. In one embodiment, the set module 325 assigns the same audience ID to each set attributed to the same audience member.

In practice, for example, one set may contain the transactions collected based on an audience member's activities using their mobile computer at home (e.g., filtering based on MAC address and location). Activities include checking email, purchasing products online, communicating with friends on a social network and the like. The transactions collected for these activities include unique IDs such as user names, passwords, billing information, etc. consistently used by the audience member. The set module 325 computes combinations of these unique IDs to identify sets not attributed to the audience member due to the initial filtering parameters.

Consider, for example, initial filtering parameters that assign transactions to a set based on a device and location. Correlation based on the combination of a MAC address and account or billing information can identify sets corresponding to the audience member's use of the same device at work and in a nearby city. Additionally, a combination of account and billing information can identify a collection of sets corresponding to the audience member's use of another device (e.g., with a different MAC address) but with the same accounts. Alternatively, if initial filtering did not use the MAC address, sets having transactions corresponding to the same device may also be identified. The collection of sets attributed to the audience member contains transactions for the combination of devices, locations, accounts, etc., associated with their activities. In turn, incoming transactions with transaction information containing one or more of these combinations are readily attributable to the audience member.

In some instances, however, sets 105 may contain similar transaction information that leads to the over correlation of the sets and their subsequent (incorrect) attribution to the same audience member. To prevent over correlation, the set module 325 may determine whether two or more sets reach a threshold of reciprocal transaction information prior to their attribution to the same audience member.

In one embodiment, the threshold used by the set module 325 for correlating two or more sets involves the determination of one or more confidence values based on the comparison of different types of transaction information across the sets. For example, matching or partially matching five character passwords and user names (or hashes thereof) would result in a lower confidence value than twelve character passwords and user names. Additionally, the matching or partially matching of both an account name and password between two sets would result in a higher confidence value than matching just one of the two.

Some information such as credit card or other financial information may explicitly indicate correlation between two sets. In such cases, the set module 325 or measurement module 340 may use the threshold to indicate whether there is fraudulent activity due to low confidence values based on the other unique IDs.

In some embodiments, the set module 325 determines the velocity between transaction information across sets prior to attributing the sets to the same audience ID. Given a set that contains multiple login transactions for an account from several clients 205 located in San Francisco, if a login event for the same account appears in another set that originated from a device in Chicago in less time that it would have taken for the audience member to travel there, the transaction (and thus the set) are suspect. The set module 325 can also determine the velocity from time zone information or the location of the interne service provider.

In some embodiments, the set module 325 determines the device settings between transactions across sets prior to attributing the sets to the same audience ID. Given a set that contains multiple login transactions to an account and transaction information indicating device settings such as the language used on the device, login transactions for that account from devices within inconsistent settings such as another language are suspect. Suspect transactions and sets are subject to further processing at the measurement module 340.

Audience ID Analysis

The audience ID module 335 analyzes the sets attributed to individual audience IDs and determines whether the sets normalize within constraints indicative of legitimate user behavior. Audience IDs with sets that normalize represent legitimate audience members and are included in the audience measurement.

If the sets attributed to an audience ID do not normalize within the constraints, the audience ID module 335 determines collections of sets (if any) that do normalize and attributes those collections of sets to new audience IDs. Audience IDs that do not normalize can indicate an illegitimate audience member and/or compromised online identity and are subjected to further processing.

In one embodiment, the ID module 335 determines statistics about audience IDs based on the transaction information used to define their associated sets. Based on these statistics, the ID module 335 determines constraints that are applied to the audience IDs. If the audience ID normalizes within the applied constraints, the ID module 335 indicates that the audience member is legitimate.

For global analysis performed over many audience IDs, the ID module 335 determines statistics that include the average number of sets associated with legitimate audience members based on the number of devices, locations, account names, passwords, credit cards, billing addresses and other unique IDs used for performing their online activities. As the majority of legitimate audience members operate within similar global constraints (e.g., operate up to 3 devices and 1-5 email accounts, etc.), audience IDs that deviate from the global average are subjected to further analysis. In one embodiment, the ID module determines these statistics by tabulating the number of initial sets attributed to each audience ID and applies the global constraints based on the average number per audience ID. The ID module may determine the statistics based on a sliding scale and/or as absolute values. The sliding scale specified a time period over which to tabulate the number of sets. Sets that do not have attributed transactions within the time period examined using the sliding scale are omitted.

One example of a global constraint is the number of sets attributed to a legitimate user based on one or more unique identifiers. For example, the average legitimate audience member may access between one and five accounts with a particular service for personal or business use. If twenty-five sets corresponding to twenty-five different registered accounts with the service are attributed to a single audience ID, the sets would not normalize within the global constraint.

Additionally, the average legitimate audience member may access content with one up to a maximum of three devices over a specified time period such as a week. Accordingly, if twenty-five sets 105 corresponding to twenty-five different devices are attributed to a single audience ID within a day, they would not normalize within the global constraint. In either instance, the audience member may be engaging in fraudulent activities and inflating the audience measurement.

For local analysis performed for individual audience IDs, the ID module 335 determines statistics that include the number and history of sets and transactions associated with an audience ID and the common combinations of unique IDs and contextual information used for online activities. The ID module 335 stores these statistics in the database 255 in relation with the audience ID. As the majority of legitimate audience members operate within their local constraints (e.g., operate the same device and email accounts from the same location, etc.), incoming transactions and sets attributed to the user that deviate from their expected activities are subjected to further analysis.

One example local constraint is the historical combination of sets attributed to a legitimate user. Given that a typical legitimate audience member generally performs only activities using a fixed number of devices in fixed locations (e.g., work, home or around their hometown), most of the transactions accumulate in a fixed number of sets corresponding to those devices and locations (or combination thereof). If a set without a likely combination of transaction information is attributed to the audience member, the set could indicate fraudulent activity. Similar to the aforementioned global constraints, difficulties often arise in discerning whether the sets falling outside of the established trend correspond to legitimate or illegitimate activities and may be subjected to further analysis.

Whereas the ID module 335 previously examined individual audience IDs to determine whether the sets therein normalized within the behaviors of legitimate audience members, other embodiments of the ID module 325 analyze sets across multiple audience IDs to determine correlations between two or more audience IDs. In some embodiments, the correlation of audience IDs indicates their sets are attributable to the same audience member or should be omitted from the results. In other instances, the correlation of audience IDs describes relationships between audience members. The relationships between the audience members may indicate fraudulent or legitimate behavior.

In one embodiment, the ID module 335 determines whether two or more audience IDs represent a single audience member based on an analysis of the collection of sets attributed to each audience ID. Typically, at this stage, the sets attributed to the audience IDs and the audience IDs themselves are well defined. The ID module 325 seeks to root out anomalies and therefore relies less on unique IDs and more heavily on contextual information surrounding a small number of unique IDs or a specific activity.

For example, the ID module 325 may examine the audience IDs associated with a particular combination of transaction information and determine whether suspicious contextual information indicates fraudulent behavior. The combination of transaction information can include both unique identifiers and contextual information for specific activities such as a specific hardware/software configuration visiting the same URL (e.g., clicking on or viewing an add), video or creating numerous accounts. One specific example may result from an illegitimate audience member masking or spoofing their MAC address, IP and/or software identity while repeatedly performing an activity such as creating user accounts with a web service. Audience IDs representing these activities will typically contain few transactions related to other online activities. Accordingly, the ID module 325 may suspect audience IDs performing the same activity with low ratio of transactions performing other activities as fraudulent.

In one embodiment, the ID module 335 determines relationships between two or more audience IDs. For example, the ID module 335 identifies audience members that commonly use the same accounts, devices or financial information for online activities. The ID module 335 may store the identified audience IDs and the combination of unique IDs describing their commonalities in the database 255. If both the audience IDs are determine to be legitimate, the relationship is legitimate. If one of the audience IDs in the relationship is determined to be illegitimate, the relationship is illegitimate.

Audience Measurements

The measurement module 340 performs further analysis on the transactions, sets and audience IDs other modules flag as suspect to determine their legitimacy. In one embodiment, the measurement module 340 examines the history of an audience ID associated with suspect transactions, sets or audience IDs. If the audience ID does not normalize within constraints indicative of normal user behavior, the transactions and audience ID are marked as illegitimate. The measurement module 340 may then determine whether the illegitimate activities (e.g., falsifying account or financial information) affect another audience member.

If the audience ID normalizes within the constraints indicative of normal user behavior, the measurement module 340 considers the activities described in the transaction information for one or more suspect transactions and sets. If the activities (e.g., online purchase, browsed web pages) are commonly performed by the audience member and the transaction information of a suspect transaction does not indicate nefarious behavior such as account creation, change of account or financial information, the measurement module 340 categorizes the transaction as legitimate.

In one embodiment, the measurement module 340 analyzes relationships to determine the identities of audience members that share accounts based on multiple audience members are using the account simultaneously, violating velocity measurements or device settings. Thus, for example, if the account is held with a pay-to-play site, the measurement module 340 can monitor transactions associated with the account and report on the audience IDs using the account. The measurement module 340 may also determine that received transactions including a combination of information specified by a legitimate relationship are fraudulent if they are not attributable to an audience ID associated with the relationship.

In one embodiment, the measurement module 340 determines discrepancies of the final assignments of transactions between audience IDs for different combinations of initial filtering parameters. More specifically, the measurement module 340 selects a transaction (e.g., a suspect transaction)

and determines the audience IDs (e.g., one for each combination of initial filtering parameters) corresponding to the transaction and compares the transactions from each audience ID. The measurement module 340 determines the number of transactions that are missing (or added) from one combination to another.

The measurement module 340 examines the audience ID assignment of missing transactions for each combination missing one or more transaction. The measurement module 340 determines (e.g., based on reciprocal transaction information) the best set and audience ID for the transaction and modifies its assignment accordingly. If one or more of the audience IDs containing a misplaced transaction have high number of discrepancies, they are marked as illegitimate along with the examined audience ID as its actions are obfuscated with (or attempting to imitate) other audience members.

The measurement module 340 also determines various measurements based on the audience IDs and their respective sets and transactions responsive to requests from the content server 235 or another entity. Requests may include indications of online content such as keywords, a web site domain or URL of a web page and online activity or user related information such as a unique ID. In some embodiments, the measurement module 340 specifies initial filtering parameters to the set combination module 315 to produce a desired measurement.

In one embodiment, the measurement module 340 examines the database 255 in response to a request specifying one or more unique IDs to determine the audience ID(s) associated with transactions having the specified information. The measurement module 340 returns the transactions attributed to the audience ID for a measurement of the corresponding audience member's activates.

In one embodiment, the measurement module 340 examines the database 255 in response to a request specifying online content to determine transactions corresponding to the request and the associated audience IDs. The measurement module 340 reports the number of legitimate audience IDs as the online audience and tabulates the number of their transactions having the specified information as the number of views. The measurement module 340 may also consider transactions over different periods of time to report trends in viewership and number of views related to the online content.

In one embodiment, the measurement module 340 examines the database 255 in response to a request specifying a selection of online content to determine transactions corresponding to the request and the associated audience IDs. The measurement module 340 reports the number of legitimate audience IDs as the online audience for the selection of sites and the number of transactions as the number of views. The measurement module 340 may report information for each selection independently or in the aggregate. The measurement module 340 may also consider transactions over different periods of time to report trends in viewership from one selected item of content to another and number of views related to the online content.

In one embodiment, the measurement module 340 receives a request for trends related to the methods (e.g., using a mobile device vs desktop), devices (e.g., a tablet or mobile phone), software (e.g., browser or operating system) and location used to conduct activities online by legitimate audience members, illegitimate audience members or both. The measurement module 340 examines the database for transactions with transaction information matching the request and tabulates the number of transactions. The measurement module 340 may also examine the database for transactions with opposing transaction information and tabulate those transactions for reporting a ratio such as 73% of all mobile users accessing a given website use a tablet.

In one embodiment, for example, the measurement module 340 receives a request for trends related to audience members' response to a given advertisement (or advertisements in general). The measurement module 340 examines the database for transactions associated with the advertisement (or a number of advertisements) and determines the number of legitimate audience members that viewed the advertisement. The measurement module 340 may also determine overall characteristics, demographics or trends of audience members that viewed the advertisement. Additionally, the measurement module 340 may transmit the characteristics of one or more legitimate audience members along with the number times each audience member viewed the advertisement. Advertisers may use the characteristics to target the audience member for additional and/or different advertisements.

In some embodiments, the trends for one or more advertisements include an indication of audience members' receptiveness to a specified advertisement compared to other similar advertisements, advertisements of different types (e.g., click through ad or brand elevation) and all advertisements. Advertisements may use the trends to determine the effectiveness of a given advertisement or type of advertisement. The trends may also indicate a setting (e.g., time, location and/or device) associated with viewing of advertisements. Accordingly, advertisers can determine the receptiveness of audience members (or a number of individual audience members) to different advertisements and advertisement types based on setting. Advertisers and their partners may use the setting to adjust the delivery of advertisements.

In one embodiment, for example, the measurement module 340 monitors trends in transactions associated with an audience member based on the audience member's activities (e.g., suspected nefarious behavior). For example, the measurement module 340 may monitor transactions assigned to an audience member using multiple credit cards (e.g., those belonging to other audience members) or making purchases that exceed an established threshold or trend. Audience members engaging in nefarious behavior may be reported to the online entity originating the transaction to prevent fulfillment of a purchase or confirmation of registration information.

In one embodiment the measurement module 340 monitors transactions associated with different available networks and networked devices associated with those networks. The networks can include both wired and wireless networks and connected devices. The presence of one or more identified networks in transaction information may be used to distinguish between audience members and provide contextual information for the transaction such as location of the audience member, location of services near the audience member and proximity to other audience members.

In one embodiment the measurement module 340 monitors transactions associated with a payment system such as electronic wallets. Electronic wallets may utilize non-traditional payment mechanisms and produce payment information that does not necessarily have a one-to-one relationship with a limited number of audience members. For example, an electronic wallet system may produce a one-time account number for use by an online audience member. By monitoring transactions associated with the payment system, the audience measurement module 340 may deduce information about audience members using the service and individual audience members themselves for providing an accurate number of users participating in the service and determining whether a transaction is fraudulent.

In one embodiment, the measurement module 340 monitors trends in devices associated with transactions based on capabilities of the device such as connection speed or connection strength, GPS, radiation, audio or video capture and other sensors. For example, the measurement module 340 may provide information about which devices include a set of capabilities and the number and whether a specific device includes one or more capabilities.

In one embodiment, the measurement module 340 receives a request for the online audience having a specified combination of transaction information (e.g., by web site URL and device type). The measurement module 340 transmits the combination of transaction information as initial filtering parameters to the set combination module 315. After one or more audience analysis processes are performed, the measurement module 340 examines the database 255 and tabulates the number of initial sets associated with legitimate audience IDs and reports the number of sets as the measurement. Additionally, the measurement module 340 may tabulate the number of audience IDs associated with an initial set to report the portion of the audience associated with a specific combination (e.g., visits website X with a mobile device) of transaction information.

The measurement module 340 may also report similar information for illegitimate audience IDs and trends related to their illegitimate activities.

Measurement Methodology

Figure 4:
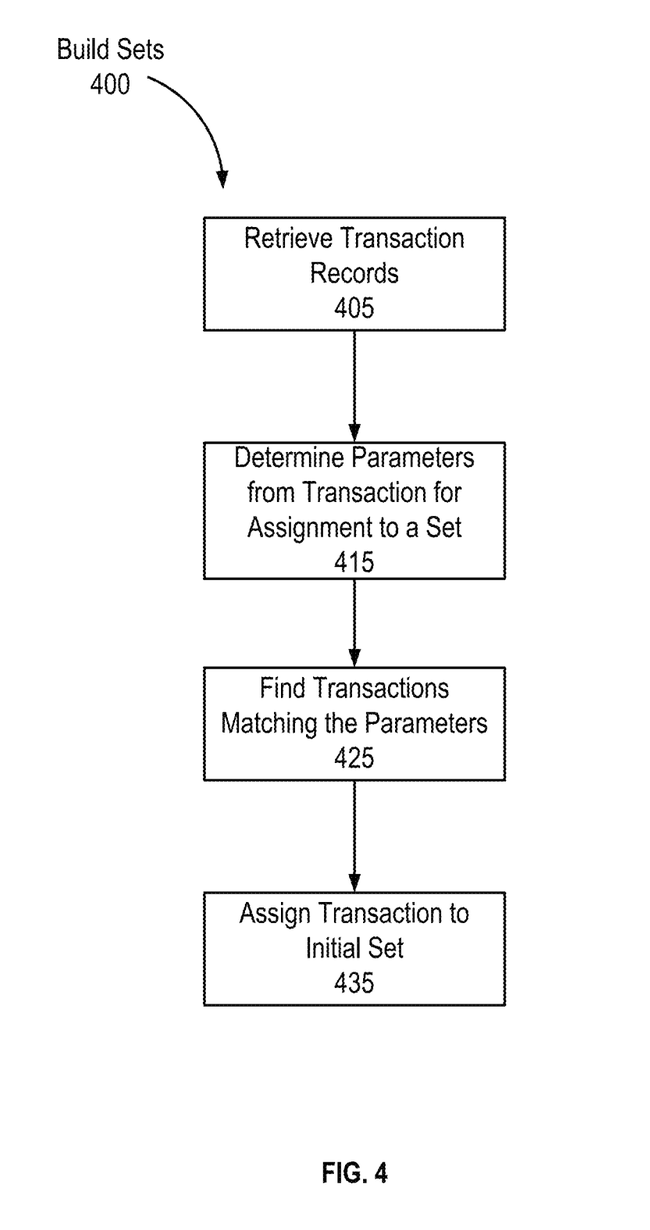
FIG. 4 is a flowchart illustrating a method for building sets performed by an audience analysis server, according to one embodiment.

FIG. 4 is a flowchart illustrating a method for building sets 400 performed by an audience analysis server 250, according to one embodiment. Other embodiments can perform the steps of the method in different orders and can include different and/or additional steps. In addition, some or all of the steps can be performed by entities other than the analysis server 250.

The content server 235 collects transaction information 101 about devices used to perform online activities and the activity performed. Collected information corresponding to a device and activity is stored as a transaction record 100. The content server 235 transmits the transactions records to an audience analysis server 250 for processing.

The audience analysis server 250 retrieves 405 transaction records 100 from one or more content servers 235 and stores the transaction records for processing. The audience analysis 250 determines 425 initial filtering parameters for assigning stored transactions to sets from the transaction information. The initial filtering parameters specify a combination of transaction information for separating the transaction records into initial sets. In some embodiments the initial filtering parameters are determined based on the desired result of tabulating initial sets after the audience analysis process.

With the initial filtering parameters determined, the audience analysis server 250 analyzes stored transactions and finds 425 all the transactions with transaction information matching the initial filtering parameters. In turn, the audience analysis server 250 assigns 435 each of the transaction to an initial set with matching values for the initial filtering parameters. Each initial set is associated with at least once audience ID that corresponds to an individual audience member.

In some embodiments, the audience analysis server 250 optionally assigns transactions without the required transaction information to sets. However, rather than being assigned to an initial set, these transactions are assigned to a set specified by a different combination of transaction information. The audience analysis server 250 may use these sets in the audience analysis process but they do not count for certain measurements based on the initial sets.

The audience analysis server 250 can perform steps 405, 425 and 435 repeatedly as the server 250 stored, requests or determines new data.

Figure 5:
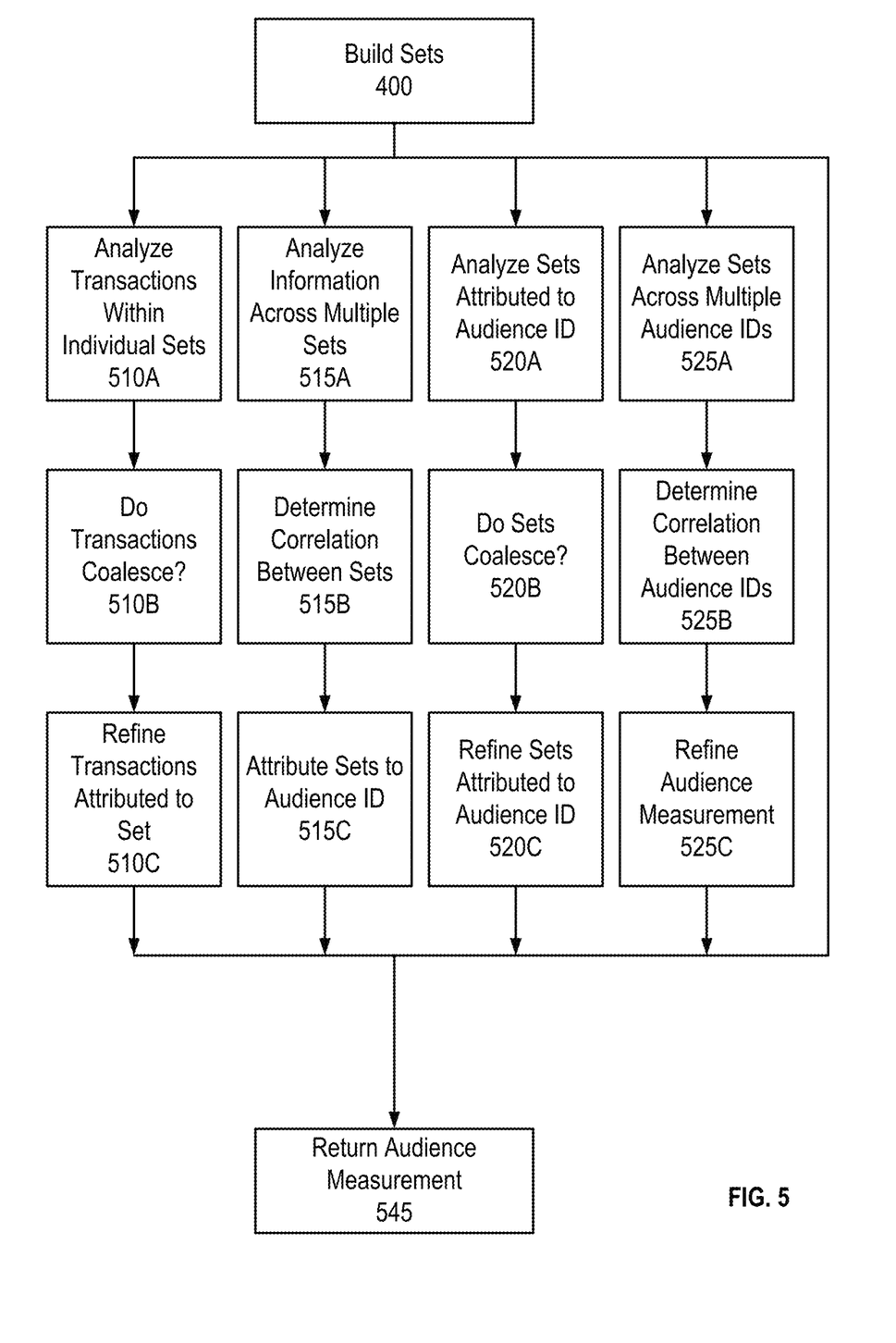
FIG. 5 is a flowchart illustrating a method for determining the online audience of online content performed by an audience analysis server, according to one embodiment.

FIG. 5 is a flowchart illustrating a method for determining the online audience of online content performed by an audience analysis server 250, according to one embodiment. Other embodiments can perform the steps of the method in different orders and can include different and/or additional steps. In addition, some or all of the steps can be performed by entities other than the audience analysis server 250.

The audience analysis server 250 builds 400 sets according to an embodiment detailed herein. The set building 400 results in a plurality of initial sets 105 with one or more assigned transaction records 100. Prior to returning an audience measurement 545, the audience analysis server 250 may iteratively perform one or more audience analysis processes 510, 515, 520, 525. The audience analysis server 250 can perform steps 510, 515, 520, 525 repeatedly as the server 250 stores, request or determines new data. In one embodiment, the audience analysis server 250 performs one or more steps 510, 515, 520, 525 as incoming transactions are added to existing or new sets.

The audience analysis server 250 analyzes 510A the transactions 100 within individual sets 105 to determine 510B whether the transactions coalesce. The transactions 100 within a set 105 coalesce if they can be attributed to a single audience member based on their transaction information 101.

If the transactions 100 do not coalesce, the audience analysis server 250 may refine 510C the transactions 100 attributed to the set 105 until the set contains coalescing transactions. In one embodiment, the audience analysis server 250 determines collections of coalescing transactions 100 within the set 105 and creates a new set and audience ID for each collection.

The audience analysis server 250 analyzes 515A the transaction information 101 across multiple sets 105 to determine 515B correlations between sets. Any two sets 105 correlate if, considering their respective transactions' 100 information, are attributable to the same audience member. In one embodiment, the audience analysis server 250 determines whether sets meet a threshold of correlated transaction information before attributing 515C the sets to the same audience ID.

The audience analysis server 250 analyzes 520A the sets 105 attributed to individual audience members to determine 520B whether the sets coalesce. The sets 105 attributed to an individual audience member coalesce if they normalize under constraints indicative of the behavior of a single, legitimate audience member. The audience analysis server 250 stores data describing which audience IDs have coalescing sets to indicate the legitimacy of the transactions attributed to the audience member.

If the sets 105 do not coalesce, the audience analysis server 250 may refine 520C the sets 105 attributed to the audience ID until the sets attributed to the audience ID coalesce. In one embodiment, the audience analysis server 250 determines collections of coalescing sets 105 attributed to the audience ID and creates new a new audience ID for those collections.

The audience analysis server 250 analyzes 525A the sets across multiple audience IDs to determine 525B correlations between two or more audience IDs. The correlations may indicate that two or more audience IDs correspond to a single audience member. The correlation may also indicate relationships between two or more audience IDs that correspond to single audience members.

If the correlating 525B indicates audience IDs corresponding to a single audience member, the audience server 250 aggregates the sets associated with the audience IDs under a single audience ID to refine 525C the audience measurement. If the correlating 525B indicates a relationship between audience IDs, the audience server 250 determines a combination of transaction information representing the relationship and stores the data to refine 525C the audience measurement.

The audience analysis server 250 analyzes the collection of audience IDs and their corresponding sets, and/or transaction information to return 545 an audience measurement including one or more of: activities of individual members of the online audience, categorization of individual members of the online audience, trends related to activities for a given site, trends related to activities for a selection of sites, trends related to activities for the universe of sites, and trends related to the methods or devices used to conduct activities.

In some embodiments, the audience analysis server 250 provides one or more audience measurements (e.g., analysis or characteristics associated with one or more illegitimate audience members or illegitimate transactions) among multiple entities to help mitigate the activities of illegitimate members of the online audience. Once an illegitimate audience member or transaction is identified, the entities can perform actions to lessen the impact of illegitimate activities by performing actions such as blocking an audience member from accessing a site, rejecting a transaction (e.g., for an online purchase), disabling an account, removing the audience member or transaction from measurements, limiting the activities available to the audience member or otherwise reducing the ability to diminish the experience of legitimate users.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving a plurality of online transactions representing online activities of a plurality of audience members, each transaction of the plurality of online transactions having associated transaction information;
assigning each transaction in the plurality of the online transactions to a set in a plurality of initial sets based on one or more characteristics of the transaction information associated with each transaction;
dividing each of the initial sets into two or more subsets, each subset being associated with a single distinct audience member of the plurality of audience members;
generating a plurality of new sets of transactions, the plurality of new sets comprising the subsets of the plurality of the initial sets;
associating each of the plurality of new sets with an audience identifier representing one of the plurality of audience members that performed the transactions assigned to each new set;
analyzing the new sets across multiple audience identifiers to determine correlations between two or more audience identifiers;
determining a relationship between a first audience identifier and a second audience identifier based on the first and second audience identifier being correlated based from the analysis;
storing the relationship between the first and second audience identifiers; and
obtaining representations of one or more illegitimate audience members within the plurality of audience members, a representation of an illegitimate audience member comprising at least one transaction or one set in a collection of sets of transaction performed by a single audience member indicating use of one or more of:
a hijacked account;
a fake identity;
stolen financial information; and
an automated computer program.

2. The method of claim 1, wherein the first and second audience identifier have at least one matching characteristic of transactions associated with the first audience identifier and transactions associated with the second audience identifier.

3. The method of claim 2, wherein the at least one matching characteristic is financial information.

4. The method of claim 3, wherein transactions associated with the first audience identifier and transactions associated with the second audience identifier have different characteristics for at least one of: a user account with a device performing the transaction, a media access control address, an internet protocol address, and a cookie value.

5. The method of claim 3, wherein transactions associated with the first audience identifier and transactions associated with the second audience identifier have different characteristics for at least one of: a registered user account name and password, and an email address.

6. The method of claim 1, further comprising determining that the first audience identifier and the second audience identifier are legitimate, and the relationship between the first and second identifiers is legitimate.

7. The method of claim 1, further comprising determining a transaction is fraudulent based on deviations in transaction information of the transaction from combinations of transaction information common to the first and second audience identifiers.

8. The method of claim 1, wherein one of the first and second audience identifiers is determined to be illegitimate, and the relationship between the first and second identifiers is illegitimate.

9. The method of claim 1, wherein the transaction information comprises characteristics describing one or more of: a user account with a device performing the transaction, a media access control address, an internet protocol address, and a cookie value.

10. The method of claim 1, wherein the transaction information comprises characteristics describing one or more of: a registered user account name and password, an email address, a credit card number, a bank account number, a shipping address, a billing address, an online payment account, and hashes thereof.

11. The method of claim 1, further comprising:
analyzing correlation among the plurality of new sets, wherein two or more sets are correlated if one or more corresponding transactions of the two or more sets contain reciprocal information associated with a same audience identifier.

12. The method of claim 11, wherein the reciprocal information includes one or more of: user names, email addresses, and password hashes and fingerprints.

13. A non-transitory computer-readable storage medium comprising computer program instructions that when executed by one or more processors perform steps to:
receive a plurality of online transactions representing online activities of a plurality of audience members, each transaction of the plurality of online transactions having associated transaction information;
assign each transaction in the plurality of the online transactions to a set in a plurality of initial sets based on one or more characteristics of the transaction information associated with each transaction;
divide each of the initial sets into two or more subsets, each subset being associated with a single distinct audience member of the plurality of audience members;
generate a plurality of new sets of transactions, the plurality of new sets comprising the subsets of the plurality of the initial sets;
associate each of the plurality of new sets with an audience identifier representing one of the plurality of audience members that performed the transactions assigned to each new set;
analyze the new sets across multiple audience identifiers to determine correlations between two or more audience identifiers;
determine a relationship between a first audience identifier and a second audience identifier based on the first and second audience identifier having a determined correlation from the analysis;
store the relationship between the first and second audience identifiers; and
obtaining representations of one or more illegitimate audience members within the plurality of audience members, a representation of an illegitimate audience member comprising at least one transaction or one set in a collection of sets of transaction performed by a single audience member indicating use of one or more of:
a hijacked account;
a fake identity;
stolen financial information; and
an automated computer program.

14. The non-transitory computer-readable storage medium of claim 13, wherein the first and second audience identifier have at least one matching characteristic of transactions associated with the first audience identifier and transactions associated with the second audience identifier.

15. The non-transitory computer-readable storage medium of claim 14, wherein the at least one matching characteristic is financial information.

16. The non-transitory computer-readable storage medium of claim 14, wherein transactions associated with the first audience identifier and transactions associated with the second audience identifier have different characteristics for at least one of: a user account with a device performing the transaction, a media access control address, an internet protocol address, and a cookie value.

17. The non-transitory computer-readable storage medium of claim 14, wherein transactions associated with the first audience identifier and transactions associated with the second audience identifier have different characteristics for at least one of: a registered user account name and password, and an email address.

18. The non-transitory computer-readable storage medium of claim 13, further comprising instructions that perform steps to determine a transaction is fraudulent based on deviations in transaction information of the transaction from combinations of transaction information common to the first and second audience identifiers.

19. A system comprising:
a processing device; and
a non-transitory computer-readable storage medium comprising computer program instructions that, when executed by the processing device, cause the processing device to:
receive a plurality of online transactions representing online activities of a plurality of audience members, each transaction of the plurality of online transactions having associated transaction information;

assign each transaction in the plurality of the online transactions to a set in a plurality of initial sets based on one or more characteristics of the transaction information associated with each transaction;

divide each of the initial sets into two or more subsets, each subset being associated with a single distinct audience member of the plurality of audience members;

generate a plurality of new sets of transactions, the plurality of new sets comprising the subsets of the plurality of the initial sets;

associate each of the plurality of new sets with an audience identifier representing one of the plurality of audience members that performed the transactions assigned to each new set;

analyze the new sets across multiple audience identifiers to determine correlations between two or more audience identifiers;

determine a relationship between a first audience identifier and a second audience identifier based on the first and second audience identifier having a determined correlation from the analysis;

store the relationship between the first and second audience identifiers; and obtaining representations of one or more illegitimate audience members within the plurality of audience members, a representation of an illegitimate audience member comprising at least one transaction or one set in a collection of sets of transaction performed by a single audience member indicating use of one or more of:

a hijacked account;

a fake identity;

stolen financial information; and an automated computer program.

* * * * *